United States Patent
Fischer et al.

(10) Patent No.: US 6,705,157 B2
(45) Date of Patent: Mar. 16, 2004

(54) METHOD AND SYSTEM FOR DETECTION OF A TIRE'S CHANGE OF STATE

(75) Inventors: Martin Fischer, Regensburg (DE); Dominik Fuessel, Dietzenbach (DE); Franz Hillenmayer, Burglengenfeld (DE)

(73) Assignee: Siemens AG, Munich (DE)

( * ) Notice: Subject to any disclaimer, the term of this patent is extended or adjusted under 35 U.S.C. 154(b) by 0 days.

(21) Appl. No.: 10/237,660

(22) Filed: Sep. 10, 2002

(65) Prior Publication Data

US 2003/0070478 A1 Apr. 17, 2003

(51) Int. Cl.[7] .............................................. G01M 17/02
(52) U.S. Cl. ......................... 73/146; 340/442; 340/444
(58) Field of Search ................................ 73/146, 146.2, 73/146.3, 146.4, 146.5, 146.8; 340/442, 444

(56) References Cited

U.S. PATENT DOCUMENTS

| | | | | |
|---|---|---|---|---|
| 4,376,931 A | * | 3/1983 | Komatu et al. | 340/447 |
| 4,966,034 A | | 10/1990 | Bock et al. | |
| 5,006,844 A | * | 4/1991 | Ohta et al. | 340/448 |
| 5,656,993 A | * | 8/1997 | Coulthard | 340/442 |
| 5,886,624 A | | 3/1999 | Herbert | |
| 5,900,543 A | * | 5/1999 | Oshiro | 73/146.2 |
| 6,112,165 A | * | 8/2000 | Uhl et al. | 702/138 |
| 6,118,369 A | | 9/2000 | Boesch | |
| 2003/0006893 A1 | * | 1/2003 | Dunbridge et al. | 340/444 |

FOREIGN PATENT DOCUMENTS

| | | |
|---|---|---|
| DE | 68911024 T2 | 11/1989 |
| DE | 69202982 | 2/1993 |
| DE | 4303591 C2 | 8/1994 |
| DE | 19937596 A1 | 3/2000 |
| EP | 0341226 | 11/1989 |
| EP | 0597940 B1 | 2/1993 |

* cited by examiner

*Primary Examiner*—Edward Lefkowitz
*Assistant Examiner*—Andre Allen
(74) *Attorney, Agent, or Firm*—Jacob Eisenberg; Siemens Schweiz

(57) ABSTRACT

Systems and methods for detecting a change of tire state may include measuring at least first and second quantities representing a tire characteristic. A new first value is then calculated by at least, in part, adding the second measured quantity to a previously calculated first value, which has been multiplied by a pre-selected parameter. A second value is then calculated by at least, in part, subtracting the previously calculated first value from the new first value. A change of tire state is indicated when the second value crosses a predetermined threshold value. In an alternative embodiment, the difference between second values for two different tires may be determined and a change of tire state is indicated when this difference crosses a predetermined threshold value.

36 Claims, 4 Drawing Sheets

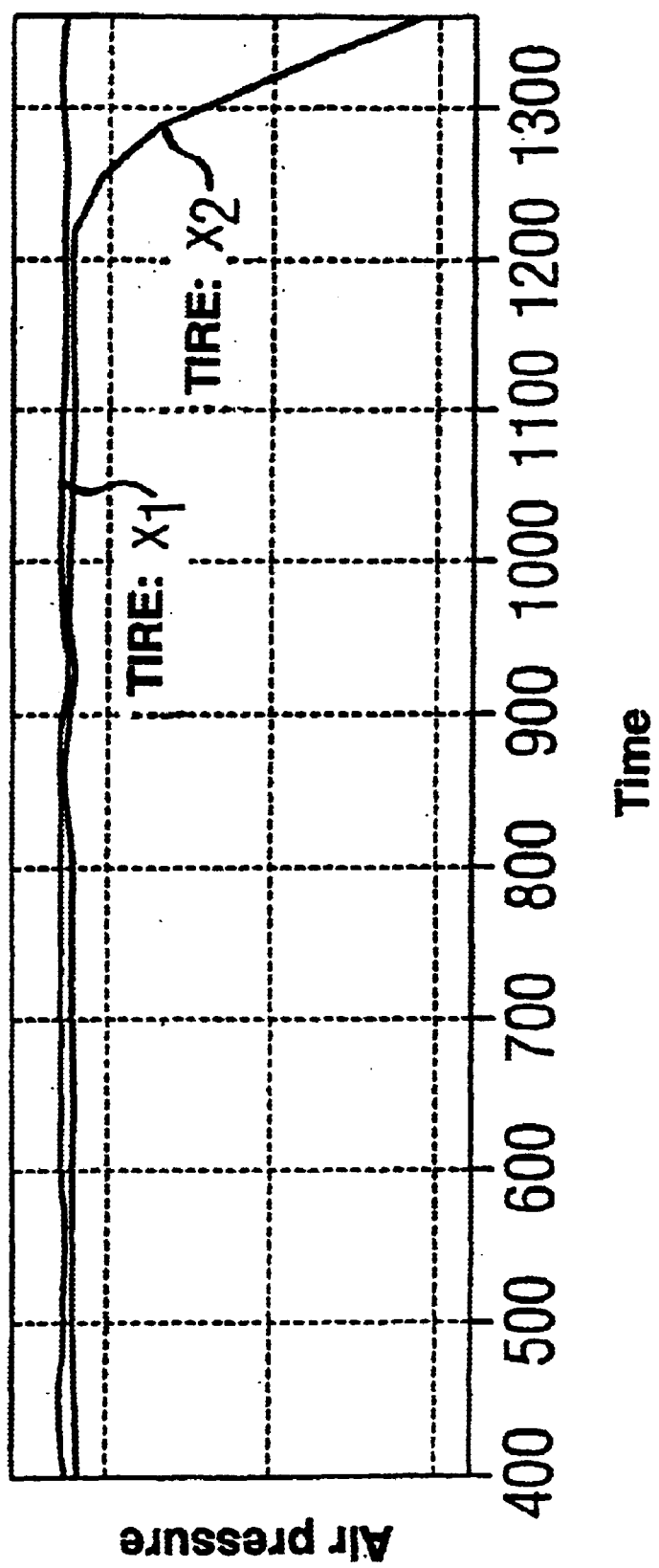

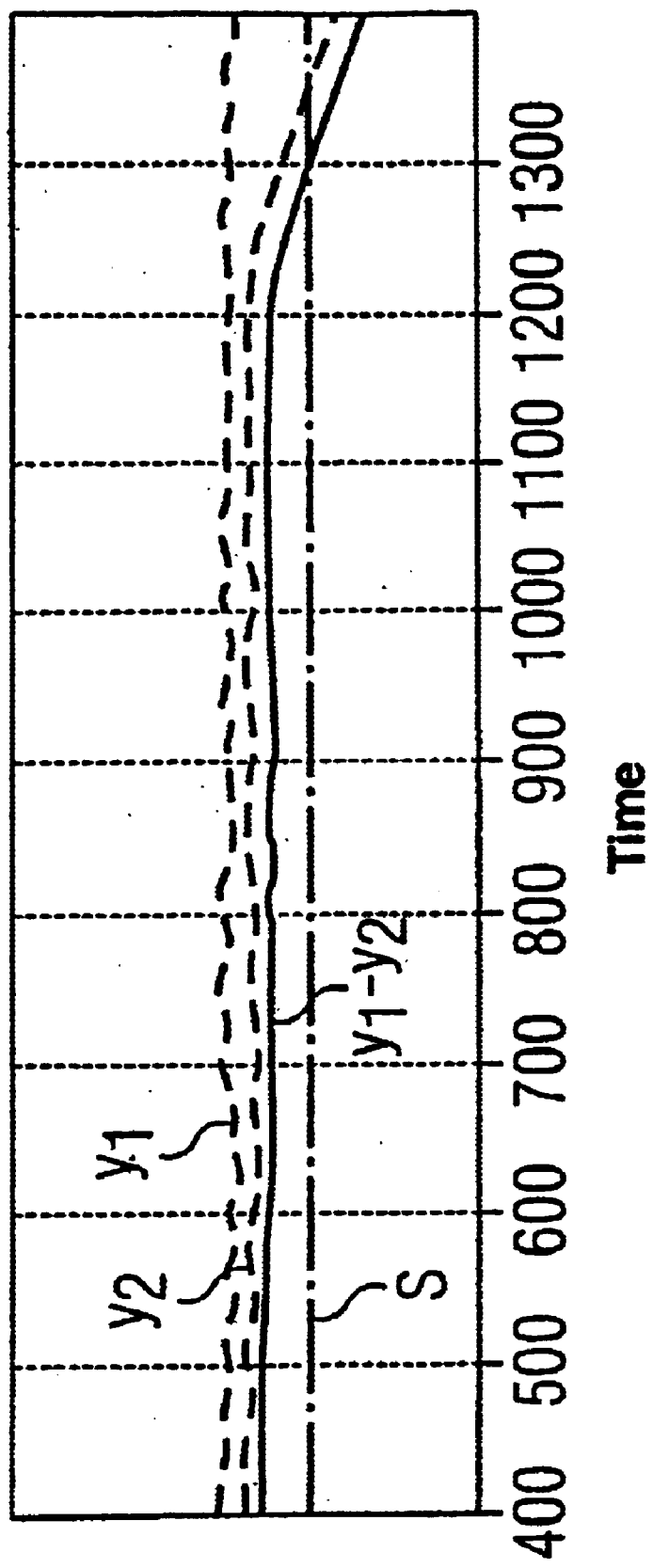

METHOD AND SYSTEM FOR DETECTION OF A TIRE'S CHANGE OF STATE

CROSS REFERENCE TO RELATED APPLICATIONS

The present application claims the benefit of priority German Application number, 10144362.5 filed Sep. 10, 2001, which is incorporated herein by reference.

BACKGROUND OF THE INVENTION

The present invention relates to the field of vehicular tire maintenance and more particularly to a method and system for detecting changes in the state of a tire. In particular, the present invention is directed to detecting pressure changes, temperature changes and the like in at least one tire mounted onto a vehicle. Tire air pressure is effected by a plurality of external forces which may result in erroneous pressure readings. Such forces include climate and climate changes, solar radiation, and the like. An unwanted result of such forces may be the false reading that the tire in question is not roadworthy and requires more air, maintenance or even replacement. Accordingly, a need exists to measure tire air pressure while taking into account external forces.

U.S. Pat. No. 5,895,846 discloses a method for processing signals within a system that monitors tires in a vehicle while the vehicle is in operation. A characteristic of this method includes a retrospective analysis of N number of stored values. As a result of these method steps, a great deal of data (in the form of numbers or values) must be stored and analyze. This results in a need for expensive information processing and supporting equipment and human expertise.

SUMMARY OF THE INVENTION

An advantage of the present invention is directed to a simple and reliably working method and system for the detection of a change of state of a tire, whereby no expensive information processing systems, support and human expertise are requisite. Another advantage is that the inventive method apply to any type of tire. The present invention operates not by analysis of all gathered data, but rather analysis of modulation of data, the modulation of which is indicative of an alarm worthy state of the tire absent external influences. The present method makes use of relatively few calculations thereby reducing the burden on information processing equipment. Furthermore, the present invention is flexible so as to apply to a variety of parameters as may be preselected before use. The present invention may operate on more than one tire at a time thereby providing a comparison if desired as well as a general state of the all a vehicle's tires. In addition to tire air pressure other considerations may be measured including temperature.

The present invention comprises a system and method wherein successive data is analyzed, and modulation of such data is obtained and compared with a threshold below which an alarm is sounded. A parameter is used to adjust the level of detail of modulation obtaining. Parameters for data may be set by that being analyzed, namely, temperature, air pressure and the like.

The present invention further comprises a method for detecting at least one tire's change of state, comprising the steps of: repeatedly measuring characteristics of said tire; determining a first value comprising addition of a first and second measured characteristics, said first measured characteristic being taken at a preselect time, said second measured characteristic being taken at a time before said preselect time and further being multiplied by a preselected parameter; determining a second value comprising said first value less said second measured characteristic; and generating a comparison of a difference of said first and second values with a predetermined threshold value, said comparison being indicative of said tire's change of state.

The present invention further comprises a method for detecting at least one tire's change of state, comprising the steps of: repeatedly measuring characteristics of said tire; determining a first value comprising addition of a first and second measured characteristics, said first measured characteristic being taken at a preselect time, said second measured characteristic being taken at a time before said preselect time and further being multiplied by a preselected parameter; determining a second value comprising said first value less said second measured characteristic; and generating a comparison of between said successive second values and a predetermined threshold value, said comparison being indicative of said tire's change of state when said second value falls below said threshold.

The present invention further comprises a system for monitoring change of state of at least one tire, comprising means for: repeatedly measuring characteristics of said tire; determining a first value comprising addition of a first and second measured characteristics, said first measured characteristic being taken at a preselect time, said second measured characteristic being taken at a time before said preselect time and further being multiplied by a preselected parameter; determining a second value comprising said first value less said second measured characteristic; and generating a comparison of a difference of said first and second values with a predetermined threshold value, said comparison being indicative of said tire's change of state.

The present invention still further comprises a system for monitoring change of state of at least one tire, comprising means for: repeatedly measuring characteristics of said tire; determining a first value comprising addition of a first and second measured characteristics, said first measured characteristic being taken at a preselect time, said second measured characteristic being taken at a time before said preselect time and further being multiplied by a preselected parameter; determining a second value comprising said first value less said second measured characteristic; and generating a comparison of between said second value and a predetermined threshold value, said comparison being indicative of said tire's change of state when said second value falls below said threshold.

BRIEF DESCRIPTION OF THE SEVERAL VIEWS OF THE DRAWINGS

The novel features and method steps believed characteristic of the invention are set out in the claims below. The invention itself, however, as well as other features and advantages thereof, are best understood by reference to the detailed description, which follows, when read in conjunction with the accompanying drawing, wherein:

FIG. 3A depicts a time history graph; and

FIG. 3B depicts a second time history graph.

DETAILED DESCRIPTION OF THE PRESENT INVENTION

The present invention will be discussed with respect to the tire characteristic being air pressure. However, it should be understood that the present invention is applicable to any measurable tire characteristic. Tires referred to herein include those belonging to any motor vehicle.

Figure 1:
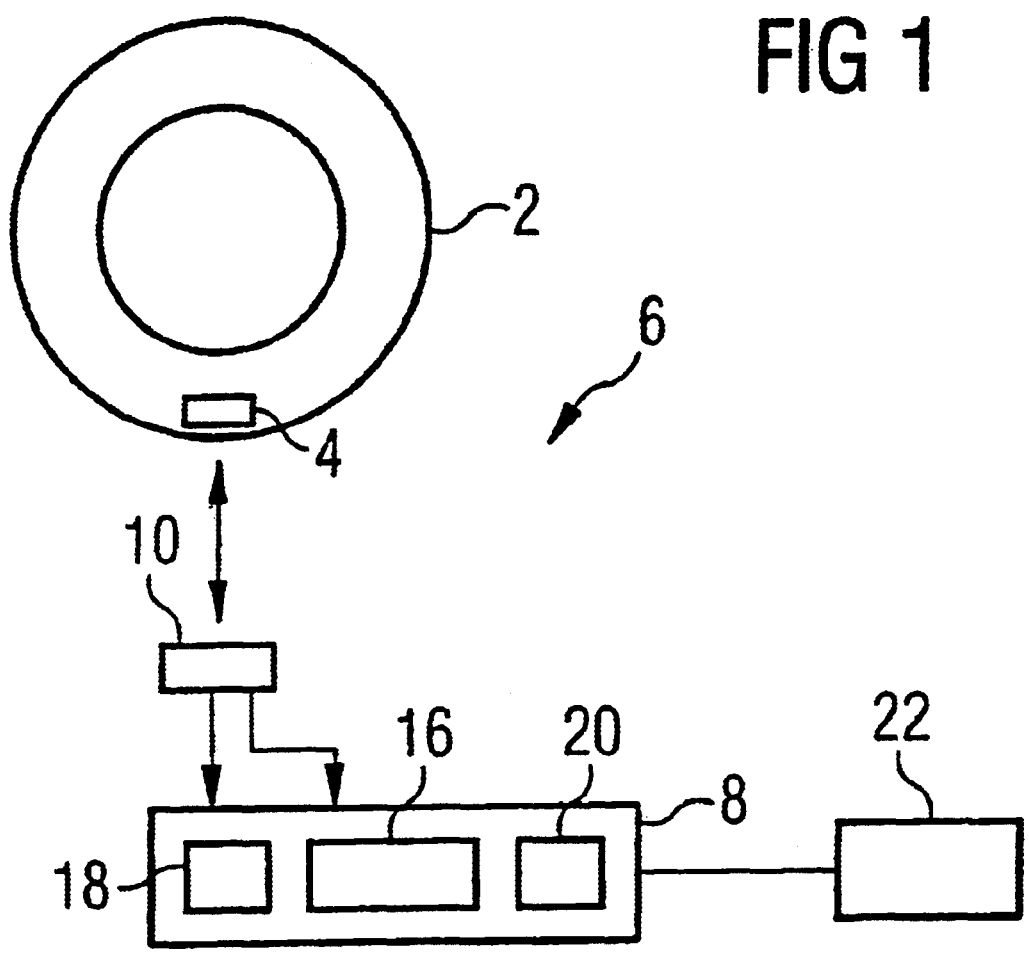
FIG. 1 depicts a system layout according to the present invention.

FIG. 1 depicts a system according to the present invention. Herein, a pressure sensor 4 is placed in a vehicle tire 2 for the detection of the air pressure within the tire. The structure and function of the sensor is known in the art. Pressure sensor 4 does not have to be placed directly within the interior of the tire. Rather, it can also be placed at a valve, so that the pressure sensitive element of the pressure sensor 4 detects the internal pressure of the tire. Sensor 4 output is communicated to evaluating unit 8 as depending upon structure and location of the sensor. Such may include: mechanically by sliding contacts, radio link 6 such as by transponder which communicates with a sending/receiving unit 10 that edits the sent signals and further directs them to evaluating unit 8. The evaluating unit 8 comprises a properly programmed microprocessor 16 with a program memory 18 and data memory 20 as known in the art. An output of the evaluating unit 8 is connected to alarm unit 22 which may comprise a warning light or display in a vehicle dashboard as well as audio devices if required.

Figure 2:
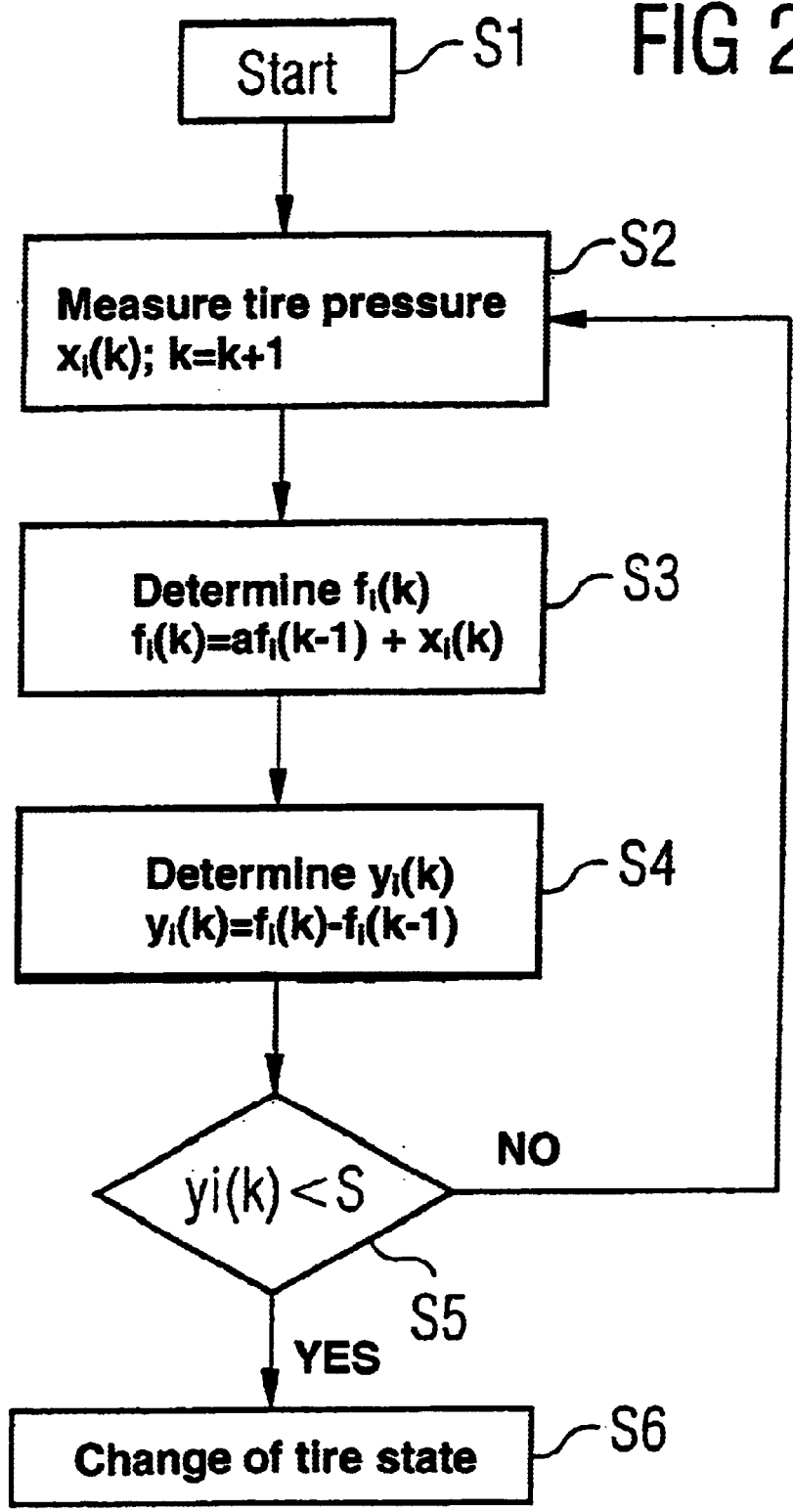
FIG. 2 depicts a method flow chart according to the present invention.

The operation of the invention will now be described with respect to the example method of FIG. 2. The method starts at step S1 and proceeds to step S2 wherein tire pressure (first characteristic measurement) $x_i(k)$ is measured over a select time period. Herein i represents the tire and k the time of each measurement. The time period may be limited by application or be continuous. In step S3, a first value $f_i(k)$ is calculated, wherein: $f_i(k)=a\, f_i(k-1)+x_i(k)$. Herein, parameter (a) is an appropriately selected parameter from between $0<a<1$ and may be a constant. The parameter is selected according to that being measured. The term $f_i(k-1)$ indicates a second measured characteristic calculated to a time $(k-1)$. In step S4, a second value $y_i(k)$ is calculated according to the formula: $y_i(k)=f_i(k)-f_i(k-1)$ wherein $f_i(k)$ is the first value and $f_i(k-1)$ is the second measured characteristic. In step S5, the second value $y_i(k)$ is then compared with a predetermined threshold value S, to detect in step S6 a change of state of the tire (i) if $y_i(k)$ falls below the threshold value. If $y_i(k)$ does not fall below threshold value S, the method returns to step S2 to continue with the next value $x_i(k)$ now measured at the time $(k+1)$. In an alternate embodiment, the second value may be compared among different tires (i) so as to arrive at a general state of health of the tires as well as any change of state among them. In another embodiment, a difference between first and second values may be calculated and compared to threshold S to determine if a drop has occurred. FIG. 3A depicts a time chart history of varying tire air pressure for two tires $x_1$ and $x_2$. As shown, tire pressure for the second tire $x_2$ drops at about time 1200. FIG. 3B depicts processed measurements from FIG. 3A. $y_1$ marks second values of tire pressure for first tire $x_1$, and $y_2$ marks the second values of the tire pressure of the second tire $x_2$. As further depicted in FIG. 3B, the pressure drop of the second tire $x_2$ is depicted when $y_2$ drops below threshold S and/or when the delta of $y_1-y_2$ drops below threshold S. The graph indicates tire pressure trends over time.

The invention being thus described, it will be obvious that the same may be varied in many ways. Such variations include applicability to temperature and other detectable tire characteristics or parameters. In addition to a single parameter or characteristic, the present invention may apply to simultaneous multi-parameter detection. Such variations are not to be regarded as a departure from the spirit and scope of the invention. All obvious modifications are intended to be included within the scope of the following claims.

We claim:

1. A method for detecting a change of state of at least one tire, comprising:

measuring a first quantity representative of a characteristic of the tire, measuring a second quantity representative of the characteristic of the tire, the second quantity being measured after the first quantity, multiplying a previously calculated first value by a preselected parameter, the previously calculated first value having been calculated at least in part based upon the first measured quantity, calculating a new first value by at least, in part, adding the second measured quantity to the previously calculated first value multiplied by the pre-selected parameter, calculating a second value by at least, in part, subtracting the previously calculated first value from the new first value, and comparing the second value with a predetermined threshold value, wherein a change of state of the tire is indicated when the second value crosses the predetermined threshold value.

2. A method according to claim 1, wherein the preselected parameter is a constant.

3. A method according to claim 1, wherein the preselected parameter is between zero and one.

4. A method according to claim 1, further comprising:

generating at least one second value for a plurality of tires, and comparing the respective second values for each tire in order to determine a change of state of each tire.

5. A method according to claim 1, wherein the tire characteristic is representative of air pressure inside the tire.

6. A method according to claim 1, wherein the tire characteristic is representative of the temperature inside the tire.

7. A method for detecting a status change of at least one of a first and second tire, comprising:

measuring first and second quantities representative of a characteristic of the first tire, the second quantity being measured after the first quantity, measuring first and second quantities representative of the characteristic of the second tire, the second quantity being measured after the first quantity, multiplying a previously calculated first value for the first tire by a pre-selected parameter, the previously calculated first value having been calculated at least in part based upon the first measured quantity for the first tire, calculating a new first value for the first tire by at least, in part, adding the second measured quantity of the first tire to the previously calculated first value for the first tire, which has been multiplied by the pre-selected parameter, calculating a second value for the first tire by at least, in part, subtracting the previously calculated first value for the first tire from the new first value for the first tire, calculating a difference between the second value for the first tire and a second value calculated for the second tire, and comparing the difference with a predetermined threshold value, wherein a change of state of at least one of the first and second tires is indicated when the difference crosses the predetermined threshold value.

8. A method according to claim 7, wherein the preselected parameter is a constant.

9. A method according to claim 7, wherein the pre-selected parameter is between zero and one.

10. A method according to claim 7, further comprising:
generating second values for at least four tires, and
comparing the respective second values for each tire in order to determine a change of state of each tire.

11. A method according to claim 7, wherein the tire characteristic is representative of air pressure inside the tire.

12. A method according to claim 7, wherein the tire characteristic is representative of the temperature inside the tire.

13. An apparatus suitable for detecting a change of state of a tire, comprising:
means for measuring first and second quantities representative of a characteristic of the tire, the second quantity being measured after the first quantity,
means for multiplying a previously calculated first value by a pre-selected parameter, the previously calculated first value having been calculated at least in part based upon the first measured quantity,
means for calculating a new first value by at least, in part, adding the second measured quantity to the previously calculated first value multiplied by the pre-selected parameter,
means for calculating a second value by at least, in part, subtracting the previously calculated first value from the new first value, and
means for comparing the second value with a predetermined threshold value, wherein a change of state of the tire is indicated when the second value crosses the predetermined threshold value.

14. An apparatus according to claim 13, wherein the pre-selected parameter is a constant.

15. An apparatus according to claim 13, wherein the pre-selected parameter is between zero and one.

16. An apparatus according to claim 13, further comprising:
means for generating at least one second value for a plurality of tires, and
means for comparing the respective second values for each tire in order to determine a change of state of each tire.

17. An apparatus according to claim 13, wherein the tire characteristic is representative of air pressure inside the tire.

18. An apparatus according to claim 13, wherein the tire characteristic is representative of the temperature inside the tire.

19. An apparatus suitable for detecting a change of state of a tire, comprising:
means for measuring first and second quantities representative of a characteristic of the first tire, the second quantity being measured after the first quantity,
means for measuring first and second quantities representative of the characteristic of the second tire, the second quantity being measured after the first quantity,
means for multiplying a previously calculated first value for the first tire by a pre-selected parameter, the previously calculated first value having been calculated at least in part based upon the first measured quantity for the first tire,
means for calculating a new first value for the first tire by at least, in part, adding the second measured quantity of the first tire to the previously calculated first value for the first tire, which has been multiplied by the pre-selected parameter,
means for calculating a second value for the first tire by at least, in part, subtracting the previously calculated first value for the first tire from the new first value for the first tire,
means for calculating a difference between the second value for the first tire and a second value calculated for the second tire, and
means for comparing the difference with a predetermined threshold value, wherein a change of state of at least one of the first and second tires is indicated when the difference crosses the predetermined threshold value.

20. An apparatus according to claim 19, wherein the pre-selected parameter is a constant.

21. An apparatus according to claim 19, wherein the pre-selected parameter is between zero and one.

22. An apparatus according to claim 19, further comprising:
means for generating second values for at least four tires, and
means for comparing the respective second values for each tire in order to determine a change of state of each tire.

23. An apparatus according to claim 19, wherein the tire characteristic is representative of air pressure inside the tire.

24. An apparatus according to claim 19, wherein the tire characteristic is representative of the temperature inside the tire.

25. An apparatus, comprising:
means for receiving at least first and second measurements of a quantity representing a tire characteristic, the second measured quantity being taken after the first measured quantity, and
a processor programmed to execute:
an instruction to multiply a previously calculated first value by a pre-selected parameter, the previously calculated first value having been calculated at least in part based upon the first measured quantity,
an instruction to calculate a new first value by at least, in part, adding the second measured quantity to the previously calculated first value multiplied by the pre-selected parameter,
an instruction to calculate a second value by at least, in part, subtracting the previously calculated first value from the new first value, and
an instruction to compare the second value with a predetermined threshold value, wherein a change of state of the tire is indicated when the second value crosses the predetermined threshold value.

26. An apparatus according to claim 25, wherein the pre-selected parameter is a constant.

27. An apparatus according to claim 25, wherein the pre-selected parameter is between zero and one.

28. An apparatus according to claim 25, further comprising:
means for generating at least one second value for a plurality of tires, and
means for comparing the respective second values for each tire in order to determine a change of state of each tire.

29. An apparatus according to claim 25, wherein the tire characteristic is representative of air pressure inside the tire.

30. An apparatus according to claim 25, wherein the tire characteristic is representative of the temperature inside the tire.

31. An apparatus, comprising:
means for receiving at least first and second measured quantities representing a characteristic for at least first and second tires, the second measured quantities being taken after the first measured quantities, and a processor programmed to execute:

an instruction to multiply a previously calculated first value for the first tire by a pre-selected parameter, the previously calculated first value having been calculated at least in part based upon the first measured quantity for the first tire, an instruction to calculate a new first value for the first tire by at least, in part, adding the second measured quantity of the first tire to the previously calculated first value for the first tire, which has been multiplied by the pre-selected parameter, an instruction to calculate a second value for the first tire by at least, in part, subtracting the previously calculated first value for the first tire from the new first value for the first tire, an instruction to calculate a difference between the second value for the first tire and a second value calculated for the second tire, and an instruction to compare the difference with a predetermined threshold value, wherein a change of state of at least one of the first and second tires is indicated when the difference crosses the predetermined threshold value.

32. An apparatus according to claim 31, wherein the pre-selected parameter is a constant.

33. An apparatus according to claim 31, wherein the pre-selected parameter is between zero and one.

34. An apparatus according to claim 31, further comprising:

means for generating at least one second value for a plurality of tires, and means for comparing the respective second values for each tire in order to determine a change of state of each tire.

35. An apparatus according to claim 31, wherein the tire characteristic is representative of air pressure inside the tire.

36. An apparatus according to claim 31, wherein the tire characteristic is representative of the temperature inside the tire.

* * * * *

UNITED STATES PATENT AND TRADEMARK OFFICE
CERTIFICATE OF CORRECTION

PATENT NO. : 6,705,157 B2
DATED : March 16, 2004
INVENTOR(S) : Martin Fischer et al.

It is certified that error appears in the above-identified patent and that said Letters Patent is hereby corrected as shown below:

<u>Title page,</u>
Item [30], Foreign Application Priority Data, please add -- German 10144362.5 --

Signed and Sealed this

Thirty-first Day of May, 2005

JON W. DUDAS
*Director of the United States Patent and Trademark Office*